(12) United States Patent
Ball et al.

(10) Patent No.: US 8,675,611 B2
(45) Date of Patent: Mar. 18, 2014

(54) TRANSMISSION MODE SELECTION BASED ON RADIO LINK QUALITY AND RADIO LOAD ON THE AIR INTERFACE

(75) Inventors: Carsten Ball, München (DE); Wolfgang Payer, Ulm (DE)

(73) Assignee: Nokia Siemens Networks Oy, Espoo (FI)

( * ) Notice: Subject to any disclaimer, the term of this patent is extended or adjusted under 35 U.S.C. 154(b) by 218 days.

(21) Appl. No.: 13/131,056

(22) PCT Filed: Nov. 26, 2008

(86) PCT No.: PCT/EP2008/066200
§ 371 (c)(1),
(2), (4) Date: Jun. 21, 2011

(87) PCT Pub. No.: WO2010/060467
PCT Pub. Date: Jun. 3, 2010

(65) Prior Publication Data
US 2011/0243100 A1    Oct. 6, 2011

(51) Int. Cl.
*H04W 4/00*    (2009.01)

(52) U.S. Cl.
USPC ............. 370/334; 370/310; 455/13.3; 700/53

(58) Field of Classification Search
USPC ............. 370/335, 334, 310; 700/53; 455/13.3
See application file for complete search history.

(56) References Cited

U.S. PATENT DOCUMENTS

| | | | |
|---|---|---|---|
| 2007/0223367 A1* | 9/2007 | Wu et al. | 370/216 |
| 2008/0159203 A1 | 7/2008 | Choi et al. | 370/328 |
| 2009/0034639 A1* | 2/2009 | Hwang et al. | 375/260 |
| 2010/0142441 A1* | 6/2010 | Toda et al. | 370/328 |

FOREIGN PATENT DOCUMENTS

| | | | |
|---|---|---|---|
| WO | wo2008053754 | * | 5/2008 |
| WO | WO 2008/081453 | | 7/2008 |

OTHER PUBLICATIONS

Heath, Jr., R.W., et al., "Switching Between Diversity and Multiplexing in MIMO Systems", © 2005 IEEE, pp. 962-968.

* cited by examiner

*Primary Examiner* — Omer S Mian
(74) *Attorney, Agent, or Firm* — Harrington & Smith

(57) ABSTRACT

It is described a method for selecting a transmission mode for a radio data transfer between a user equipment and a base station of a telecommunication network. The method includes (a) determining the quality of a radio link, which extends between the user equipment and the base station, (b) determining the radio load within the telecommunication network, and (c) selecting a transmission mode based on the quality of the radio link and on the radio load. It is further described a control device for selecting a transmission mode for a radio data transfer between a user equipment and a base station and a computer program for controlling the described transmission mode selection method.

15 Claims, 2 Drawing Sheets

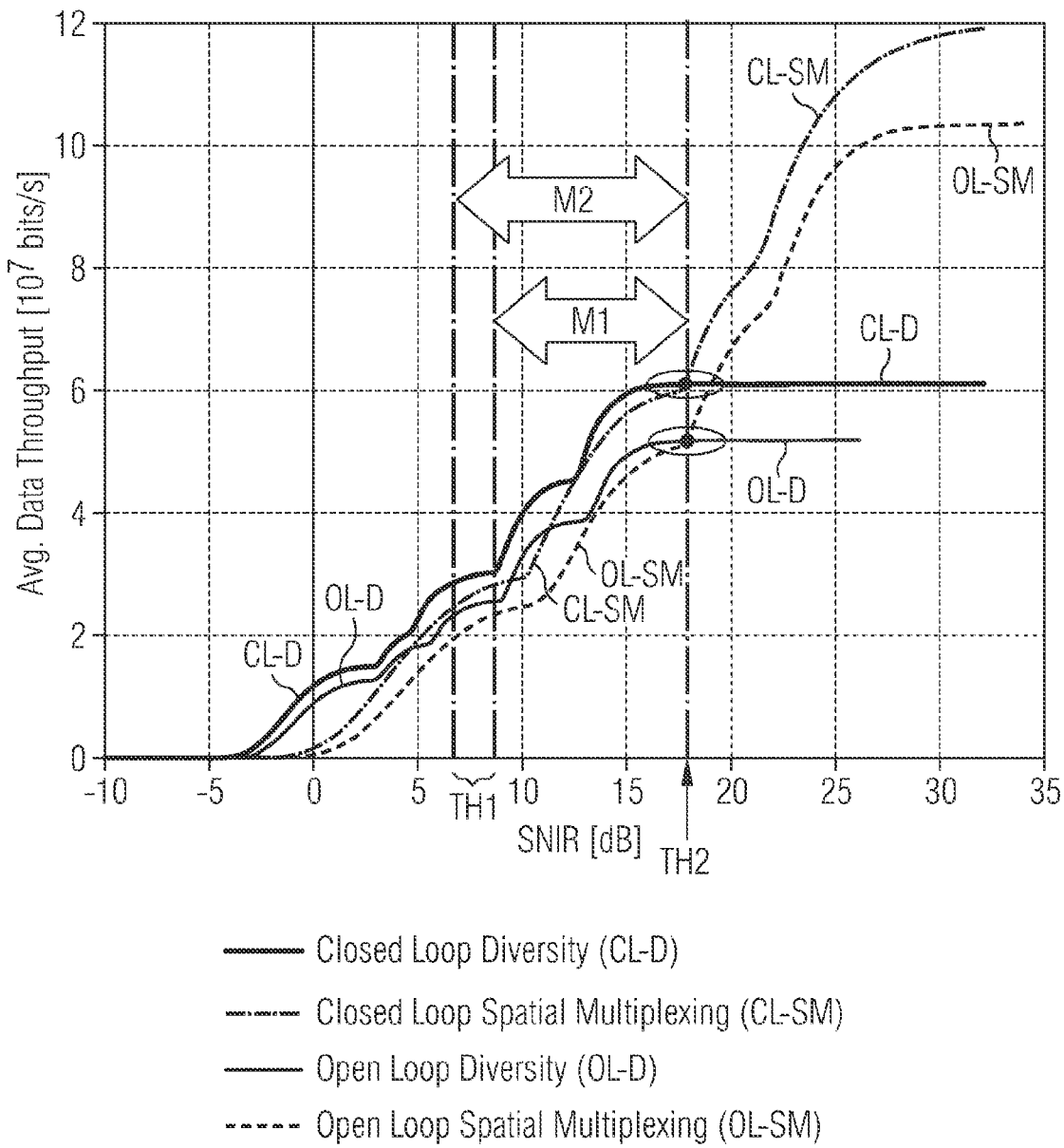

TRANSMISSION MODE SELECTION BASED ON RADIO LINK QUALITY AND RADIO LOAD ON THE AIR INTERFACE

FIELD OF INVENTION

The present invention relates to the field of radio telecommunication networks. In particular, the present invention relates to a method for selecting a transmission mode for a radio data transfer between a user equipment and a base station of a telecommunication network. Further, the present invention relates to a control device for selecting a transmission mode for a radio data transfer between a user equipment and a base station of a telecommunication network. Furthermore, the present invention relates to a computer program for controlling the described transmission mode selection method.

ART BACKGROUND

In modern radio telecommunication networks such as 3GPP Long Term Evolution (LTE) networks it is known to use different transmission modes for the communication between a mobile end terminal, which is also called user equipment (UE), and a base station (BS), which according to the LTE nomenclature is typically called enhanced NodeB (eNB). Thereby the selection of the transmission mode typically depends on the quality of the radio communication link between the UE and the BS. For a high quality radio communication link typically a transmission mode is selected, which relies on double stream transmission such as MIMO spatial multiplexing and a comparatively high modulation and coding scheme. Thereby, the redundancy within the data packets is quite low and high throughput can be achieved. For a low quality communication link typically a transmission mode is selected, which relies on single stream diversity mode and a comparatively small modulation and coding scheme. Thereby, the redundancy within the data packets is quite high, which allows the receiver of the data packet to extract all information even if some bits of the data packet have not been received correctly. Thus the link quality stays reliable but the achieved throughput is significantly lower.

In order to allow for a correct reception of data signals the sender (i.e. the BS or the UE) has to inform the receiver (i.e. the UE or the BS), which transmission mode will be used for the following data signals. This is indicated to the receiver by means of an appropriate signaling message on the so called Packet Downlink Control Channel (PDCCH). Thereby, different transmission modes require different signaling messages with different payload size and with different coding requirements for the same radio link conditions. This has severe impact on the total capacity of the telecommunication network, i.e. how many UEs can be scheduled per transmission time interval (TTI) without blocking the PDCCH.

For example the transmission modes Open Loop (OL) and Closed Loop (CL) Diversity require a comparatively small signaling message called DCI format 1 or DCI format 1x message, whereas x=A, B or C. By contrast thereto, the transmission modes Open Loop (OL) and Closed Loop (CL) Spatial Multiplexing require a comparatively large signaling message called DCI format 2 or DCI format 2x message, whereas x=A or B. Both diversity modes and spatial multiplexing modes rely on so called Multiple In Multiple Out (MIMO) techniques. Synonyms for diversity mode is single stream or single codeword transmission and for spatial multiplexing mode is double stream or double codeword transmission assuming 2×2 antennas, i.e. two antennas at the transmitter and two antennas at the receiver. Note that the proposed scheme is also applicable for higher number of antennas, i.e. for example 4×2 or 4×4 MIMO antenna configurations. If the initial transmission mode is for instance an OL or CL Spatial Multiplexing it is known to quickly react on fast changes of the quality of a radio communication link by performing a so called "dynamic MIMO switching". This procedure allows on TTI basis (or at least within some TTIs only) for a fallback to the transmission modes Diversity or Single Codeword Transmission in order to account for a deteriorated radio link. However, the excessive signaling message DCI format 2 or DCI format 2x must still be used. Thereby, the performance of the whole telecommunication system is limited.

Further, simulations of the realistic behavior of a telecommunication network show, that the transmission modes OL Spatial Multiplexing and CL Double Codeword transmission are utilized predominantly at low telecommunication network loads. With an increasing load the utilization decreases to less than 15% at full load. This means that provided that the telecommunication network is used close to capacity limits in practice only 15% of the radio links are operated with the transmission modes OL Spatial Multiplexing and CL Double Codeword transmission. Hence, always staying with all UEs in the MIMO transmission modes OL Spatial Multiplexing respectively CL Double Codeword Transmission is highly inefficient and costs capacity and performance due to limits of the PDCCH.

Furthermore, the different DCI format signaling messages are based on different radio transmission resource allocation principles. Thus it is an advantage for Radio Resource Management (RRM) to stay within the same resource allocation mode in order to preserve efficiency.

Unfortunately reconfigurations or reselections of the transmission mode are performed in LTE via slow Radio Resource Control (RRC) messaging on a timescale of approximately 50 ms to 100 ms. Therefore, it is not feasible to reconfigure or to reselect the transmission mode as fast as a "dynamic MIMO switch" within a single or at least several TTIs of 1 ms each. Moreover, when reselecting or reconfiguring the transmission mode it must be guaranteed by appropriate methods that no data gets lost and no gaps in data transmission appear, which would lower the throughput and capacity performance of the network considerably.

There may be a need for improving the selection respectively the reconfiguration of a transmission mode for a radio data transfer within a telecommunication network in such a manner that the available radio transmission resources of the telecommunication network can be used to a large extend for user data.

SUMMARY OF THE INVENTION

This need may be met by the subject matter according to the independent claims. Advantageous embodiments of the present invention are described by the dependent claims.

According to a first aspect of the invention there is provided a method for selecting a transmission mode for a radio data transfer between a user equipment and a base station of a telecommunication network. The provided method comprises (a) determining the quality of a radio link, which extends between the user equipment and the base station, (b) determining the radio load within the telecommunication network, and (c) selecting a transmission mode based on the quality of the radio link and on the radio load.

The described transmission mode selection method is based on the idea that a radio link between a user equipment (UE) and a serving base station (BS) can be configured by selecting an appropriate transmission mode by taking into account both (a) the load within the telecommunication network and (b) the actual conditions of the radio link between the UE and the BS. Thereby, the actual radio conditions for a download radio transmission from the BS to the UE and/or the actual radio conditions for an upload radio transmission from the UE to the BS can be taken into account.

It is mentioned that in Long Term Evolution (LTE) networks a BS is called enhanced NodeB (eNB). In the following the term BS is used also an eNB.

The described method may be applied on a per UE basis. This means that for each UE of the telecommunication network it can be decided individually which transmission mode shall be selected. Therefore, starting from an initial selection of the transmission mode (either semi-statically defined by Operation and Maintenance (O&M) or derived from cell statistics or early UE measurements) the described method allows for an adaptive dynamical configuration of the transmission mode for a radio data transfer between the UE and the serving BS.

The radio load within the telecommunication network may be determined in particular with respect to the cell being served by the BS. However, also inter cell-interference effects in particular from neighbouring cells as well as inter eNB signaling of Load Indicators via terrestrial interfaces such as S or X2 interface may be taken into account for the determination of the radio load.

According to an embodiment of the invention the transmission mode is selected from the transmission modes 1TX-2RX, Open Loop (OL) diversity, Closed Loop (CL) single codeword transmission, CL double codeword transmission, OL spatial multiplexing, Multi-User MIMO mode and Cooperative MIMO mode. Thereby, the transmission modes diversity, single codeword, double codeword and spatial multiplexing are associated with the known single user Multiple Input Multiple Output (MIMO) technology, wherein multiple antennas at both the transmitter and at the receiver are used in order to improve the performance of the radio communication between the transmitter and the receiver. However, the proposed method is not be restricted to single user MIMO but shall also be applicable for multi user MIMO and cooperative MIMO schemes.

Further, in particular these transmission modes being related to the MIMO technology can be used in an Open Loop (OL) or in a Closed Loop (CL) configuration. In an OL configuration the sender gets no feedback information from the receiver about the quality of the received data signals. By contrast thereto, in a CL configuration the receiver of a data signal transmits a feedback message to the sender which allows the sender to adopt its transmitting behavior. Thereby, the coding and/or the weights of data streams and/or power levels being assigned to different antenna elements may be treated in a different way. In case of a CL transmission procedure the feedback message may be a so called Precoding Matrix Indicator (PMI) message.

In the following the above described different transmission modes and the corresponding physical data propagations from the sender to the receiver are briefly discussed. Thereby, reference is made to a downlink (DL) data transmission from a BS to a UE. Of course, the same principles also apply to an uplink data transmission from an UE to a BS.

Transmission Mode 1TX-2RX

According to the transmission mode 1TX-2RX there is a single data stream respectively an analog signal representing the single data stream fed to a single antenna of the BS. The analog signal is propagated via the air interface between the BS and the UE to the UE. The UE comprises two antenna elements, which both receive the same transmission signal disturbed by individual propagation paths. The different receive signals are appropriately combined afterwards such that typically twice the signal power has been received. In order to inform the UE about the usage of the 1TX-2RX transmission mode the BS transmits a signaling message in the DCI format 1x via the Packet Downlink Control Channel (PDCCH). Thereby, x may take the values "blank", A, B or C. The 1TX-2RX transmission mode is a SIMO instead of MIMO configuration, since only a single input is available.

Transmission Modes Diversity or Single Codeword

According to the MIMO transmission modes OL diversity or CL single codeword transmission the BS must comprise at least two antenna elements. One and the same data stream is converted to two corresponding analog signals (assuming 2×2 antennas) and is fed simultaneously to both antenna elements. Thereby, a different coding, different phase factors and/or different weights and/or powers may be applied to the two different parts of the analog data signal. The resulting different radio signals, which are transmitted via the air interface, are picked up by two antenna elements of the UE. The different radio signals, which are assigned to the different antenna elements of the sender, may have the same or a different polarization, such that interference effects, which are predominantly affecting only one polarization, are not completely disturbing the radio communication link between the BS and the UE. Further, by selecting a relative phase factor between the two different parts of the analog data signal a so called spatial beam forming may be realized, wherein constructive interference occurs such that the most radio intensity is transmitted along a selected propagation direction. In order to inform the UE about the usage of the diversity or the single codeword transmission mode the BS transmits a signaling message in the DCI format 1x via the Packet Downlink Control Channel (PDCCH). Thereby, x may take the values "blank", A, B or C.

Transmission Modes Double Codeword and Spatial Multiplexing

According to the MIMO transmission modes CL double codeword transmission and OL spatial multiplexing there are different data streams respectively the corresponding different analog signals fed to different antenna elements of the BS. The resulting different radio signals representing the different data streams are transmitted via the air interface and are picked up by at least two antenna elements of the UE. Since the different radio streams may carry completely different information, a multiplexed data transmission can be realized and, as a consequence, the radio air interface between the BS and the UE can be used to full capacity. In order to inform the UE about the usage of the double codeword or spatial multiplexing transmission mode the BS transmits a signaling message in the DCI format 2x via the Packet Downlink Control Channel (PDCCH). Thereby, x may take the values "blank", A or B.

The DCI format 2x signaling message requires a radio transmission data resource on the PDCCH which is approximately one-point-five up to twice as large as the radio transmission data resource being required for the DCI format 1x signaling message. Hence, the SINR performance of DCI format 2x is significantly worse than that of format 1x, thus requiring a higher coding/aggregation level. This is on cost of the capacity of the PDCCH.

According to a further embodiment of the invention the method further comprises determining an actual speed of the user equipment, wherein selecting the transmission mode further takes into account the actual speed.

Thereby, at a high speed in particular the OL diversity transmission mode or at maximum the transmission mode OL spatial multiplexing seems feasible. The transmission mode CL spatial multiplexing may be preferably used for a UE travelling with a comparatively low speed, since a PMI report including signaling delay would indicate outdated channel conditions.

According to a further embodiment of the invention the method further comprises determining at least one technical capability of the user equipment, wherein selecting the transmission mode further takes into account the determined technical capability. This may provide the advantage that a usage of a transmission mode, which may not supported by the UE, can be avoided. For instance, UEs which do not perform double stream transmissions shall be kept exclusively at single stream transmission modes.

According to a further embodiment of the invention the method further comprises determining a quality of service (QoS) requested by the user equipment, wherein selecting the transmission mode further takes into account the requested quality of service. Thereby, the QoS is related with the kind of service such that determining the kind of service is typically sufficient in order to have information about the requested QoS. In LTE the QoS might be derived from the radio bearer related Quality Control Index (QCI) information.

This may provide the advantage that UEs, which require a higher quality of service (QoS) or which are owned by user, which have paid for a higher QoS, can be connected to the BS via a radio link taking benefit of a transmission mode, which provides for a higher QoS. Accordingly, for UEs, which require only a poorer QoS, a transmission mode can be used, which barely provide for the poorer QoS.

According to a further embodiment of the invention selecting a transmission mode comprises changing a transmission mode from a first transmission mode to a second transmission mode, wherein the change of the transmission mode is indicated by means of a slow Radio Resource Control signaling message. Thereby, the first or initial transmission might be derived from cell statistics, initial radio conditions or by semi-static O&M settings.

The described change or reconfiguration of the transmission mode may provide the advantage that during a session of a UE the transmission mode can be adapted if at least one of the quality of the radio link between the UE and the BS, of the radio load within the telecommunication network and of the speed of the UE changes. The same might be valid for changes of service requirements (QoS requirements).

It is mentioned that the described reselection or reconfiguring of the transmission mode via the slow Radio Resource Control (RRC) signaling message typically cannot be accomplished on a transmission time interval (TTI) basis. The transmission mode reconfiguration is a comparatively slow process, which takes approximately 50 to 100 ms. As a consequence, it is advantageous if the described transmission mode reconfiguration is only carried out below a certain margin under a predefined threshold with respect to the quality of the radio link between the respective UE and the BS and/or with respect to the radio load within the telecommunication network.

It is further mentioned that preferably during a change of the transmission mode is carried out the corresponding UE is not scheduled by the serving BS at all. Alternatively the UE may be scheduled with a well-defined transmission mode or a special default mode. Thereby, the potential for a data loss can be kept small. This holds in particular for a UE which requires a high QoS for instance for a real time service provided by a server of an access provider.

According to a further embodiment of the invention changing the transmission mode is started only at predefined starting times. This may mean that possible changes of the transmission mode are bound to predefined or announced time intervals. Thereby, a more or less synchronized transmission mode switching between UE and BS can be realized. This may provide the advantage that during the described slow RRC switching the BS can ensure that no data get lost.

According to a further embodiment of the invention changing the transmission mode is bound to a certain time interval and is confirmed by a radio resource control (RRC) message, which is transmitted from the user equipment to the base station. Also this may provide the advantage that the probability of loosing data during a slow RRC transmission mode reconfiguration can be reduced significantly. The RRC message may be for instance a message called "RRC configuration" and/or "RRC configuration complete".

It has to be mentioned that also other further measures can be carried out in order to guarantee, that during a slow RRC switching no data get lost. In the following there will be given three examples of such further measures:

A) The base station may be modified by a unit for scanning the actual UE behavior and prompting a transmission mode switch as soon as a malfunction is detected. This corresponds to an error handling procedure as soon as a failure with respect to a slow RRC transmission mode reconfiguration appears.

B) During the change of the transmission mode the base station may use a default signaling message in the DCI format 1x, wherein this signaling message uses different resource allocations.

C) A so called intra cell handover might be initiated in order to keep the UEs always in a well-defined status. In this respect it is mentioned that in connection with LTE telecommunication networks an intra cell handover may only initiate that other encryption keys are assigned to a radio link.

D) During the transient phase of the transmission mode change a parallel decoding of both message formats DCI format 1x and DCI format 2x could be applied.

According to a further embodiment of the invention the first transmission mode is a default transmission mode. This may mean that all UEs within at least one cell of the telecommunication network are initially assigned to the default transmission mode. The UE or the UEs may then be reconfigured to another transmission mode respectively to the second transmission mode, if the radio condition(s) and/or the radio load within the telecommunication network changes.

Preferably, the default transmission mode is OL diversity or CL single codeword transmission. This may provide the advantage that initially for the UE the efficient DCI format 1x signaling message can be used. If it is determined, that the UE may take benefit from good radio conditions, than the UE can be reconfigured to a MIMO double stream transmission mode such as CL double codeword or OL spatial multiplexing. If later on, the radio conditions for the UE again degrade, the UE can be reconfigured back to the original single stream transmission mode.

According to a further embodiment of the invention selecting a transmission mode further comprises performing a dynamic MIMO switching.

By contrast to the above described slow transmission mode reconfiguration via a slow RRC signaling message the described dynamic MIMO switching provides the advantage that it can be carried out very fast on a TTI basis (or at least with several TTIs time scale), since slow RRC signaling is not necessary. Therefore, the time scale for the dynamic MIMO switching is in the order of one or several ms. Therefore, the transmission mode can be reconfigured very fast when the radio conditions and/or the radio load changes. Precondition for dynamic MIMO switching may be the adjustment of either OL spatial multiplexing or CL double codeword transmission modes.

However, as has also been described above, by contrast to the slow transmission mode reconfiguration the dynamic MIMO switching has the disadvantage that the excessive signaling message DCI format 2 or DCI format 2x must still be used. This may easily lead to an overload of the PDCCH in particular when the network load is large. However, when allowing both the slow transmission mode reconfiguration via a slow RRC signaling message and the fast switching via the dynamic MIMO switch this drawback can be traversed at least partially. This is based on the fact that UEs, which have only poor radio conditions and which within a short term are not expected to improve their radio conditions significantly, can be signaled with DCI format 1x messages, which cause a significantly smaller load on the PDCCH.

On the other hand at a low network load all UEs can be assigned with MIMO double stream transmission modes to avoid unnecessary RRC reconfigurations. At a low network load the network suffers predominantly from low inter-cell interference and thus excellent radio conditions with excellent SINR are dominating.

Generally speaking, the described combination of a slow transmission mode switch (via a slow RRC signaling message) and a fast transmission mode switch (i.e. the dynamical MIMO switching) represents a UE specific transmission mode configuration procedure, wherein depending on the radio load and on the UEs radio conditions the fast dynamic MIMO switching is applied on top of the slow transmission mode switching.

According to a further embodiment of the invention (a) the change of the transmission mode by means of the slow Radio Resource Control signaling message is initiated when the quality of the radio link crosses a first threshold and (b) the change of the transmission mode by means of the dynamic MIMO switching is initiated when the quality of the radio link crosses a second threshold.

By means of radio quality thresholds the network load might be already implicitly covered. As a further embodiment also separate load thresholds could be established.

This may mean than an adaptive mechanism can be applied, which decides on a per UE basis and based on thresholds, which transmission mode shall be applied. Thereby, the first threshold and the second threshold can be separated by a predefined margin, which guarantees, that the different transmission mode switching procedures, i.e. the slow transmission mode switch via a slow RRC signaling message and the fast transmission mode switch via the dynamical MIMO switching do not interfere or overlap with each other.

In order to avoid a frequently change of the transmission mode if the quality of the radio link fluctuates in the region around first and/or the second threshold, a hysteresis behavior may be applied. Thereby, the threshold for upgrading the transmission mode when the radio link quality is improving may be larger than the corresponding threshold for downgrading the transmission mode when the radio link quality degrades.

The quality of the radio link may be estimated by means of a Signal to Noise Ration (SNR) of by means of a Signal to Interference and Noise Ratio (SINR). Apart from taking into account the quality of the radio link the first threshold and/or the second threshold may also take into account the radio load within the telecommunication network and optionally also take into account the speed of a moving UE. Additionally separate thresholds for speed and network load could be applied.

According to a further embodiment of the invention the quality of the radio link being assigned to the second threshold is better than the quality of the radio link being assigned to the first threshold. If the SNR or the SINR is taken as a measure for the radio link quality this means that the second threshold is larger than the first threshold.

For example if dynamic MIMO switching happens at a SINR of 15-18 dB, then those UEs having radio conditions of for instance better than 13 dB shall be reconfigured to the MIMO double stream transmission modes CL double codeword transmission or OL spatial multiplexing, which MIMO transmission modes are associated with the extended DCI format 2x signaling messages. By contrast thereto, those UEs having radio conditions of for instance below 11 dB shall be reconfigured to the single stream transmission modes OL diversity or CL singe codeword transmission, which is associated with extended DCI format 1x signaling messages. Thus, at least a margin of 2-3 dB has been implemented for security reasons as well as an appropriate 2-3 dB hysteresis for the first and/or the second threshold.

This means that under a low load of the telecommunication network the UEs may be preferably configured to the MIMO transmission modes. Since the SINR is expected to be good, the first and/or the second threshold are low and at low network load there are no or only negligible limitations to the PDCCH.

This means further that under a high network load the UEs will predominantly stay in the diversity transmission mode. Since it is expected that the SINR is bad, the first and/or the second threshold is high and thus PDCCH limitations can be mitigated. Therefore, for instance for a Long Term Evolution (LTE) telecommunication network at least almost the full capacity of the network can be achieved without creating limitation on the PDCCH.

According to a further embodiment of the invention the difference between the first threshold and the second threshold for a closed loop transmission mode selection is different from the difference between the first threshold and the second threshold for an open loop transmission mode selection.

This means that the decision thresholds, i.e. the first and the second threshold are separate for closed loop and open loop MIMO transmission modes. Moreover the value of the decision thresholds shall depend on the load of the telecommunication network. The value of the decision threshold might also take into account the speed of the UE, if it is moving. The selection between OL and CL transmission modes shall also be based on UE speed.

According to a further aspect of the invention there is provided a control device element for selecting a transmission mode for a radio data transfer between a user equipment and a base station of a telecommunication network. The control device comprises (a) a first determining unit for determining the quality of a radio link, which extends between the user equipment and the base station, (b) a second determining unit for determining the radio load within the telecommunication network, and (c) a selecting unit for selecting a transmission mode based on the quality of the radio link and on the radio load.

The described transmission mode control element is based on the idea that a radio link between a UE and a serving BS can be configured by selecting an appropriate transmission mode by taking into account both (a) the load within the telecommunication network and (b) the actual radio conditions of the UL and/or the DL radio link between the US and the BS.

Preferably, the described control element is implemented within the BS. In this case the BS is responsible for selecting a proper transmission mode. The transmission mode selection can be carried out individually for one UE or more UEs on a UE basis. However, the described control element may also be implemented in the UE. In this case the control element preferably only defines the transmission mode of the radio link between the respective UE and the BS.

It is mentioned that the above used term "determining unit" refers not only to a measurement unit, which actually measures the radio link quality and the radio load. In this application the term "determining unit" also refers to a unit, which is adapted to receive directly or indirectly the respective information from another unit, which has carried out the corresponding measurements.

According to a further aspect of the invention there is provided a computer program for selecting a transmission mode for a radio data transfer between a user equipment and a base station of a telecommunication network. The computer program, when being executed by a data processor, is adapted for controlling the transmission mode selecting method as described above.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 2 shows a diagram depicting for different transmission modes the possible average data throughputs for a radio link extending between a base station and a user equipment depending on the radio link quality.

DETAILED DESCRIPTION

Figure 1:
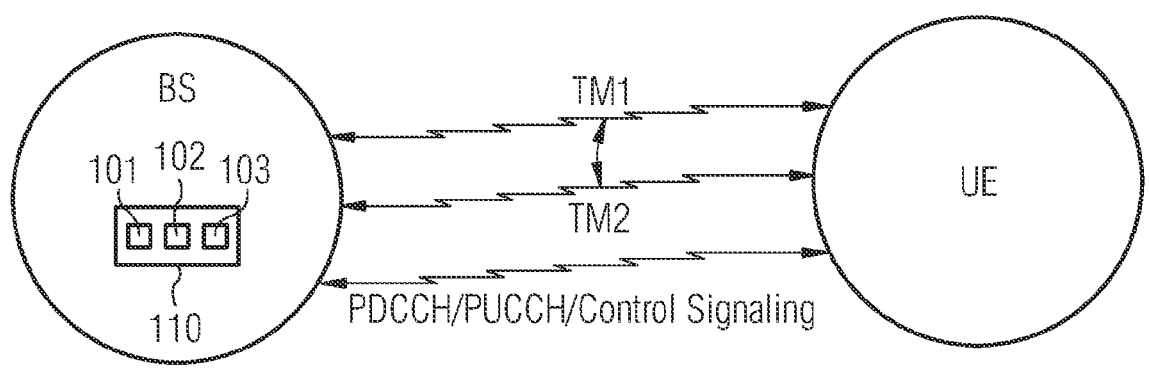
FIG. 1 shows in a schematic representation a radio link extending between a base station and a user equipment, wherein two different transmission modes can be applied for the radio link.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

FIG. 1 shows in a schematic representation a radio link extending between a base station BS and a user equipment UE. For transmitting data between the BS and the UE two different transmission modes, a first transmission mode TM1 and a second transmission mode TM2, can be used.

The base station BS comprises a control device 110. The control device 110 comprises a first determining unit 111 for determining the actual quality of the radio link and a second determining unit 112 for determining the radio load in a non depicted telecommunication network cell, to which the base station BS and the user equipment UE are assigned to. The control device 110 further comprises a selecting unit 113 for selecting a transmission mode based on the quality of the radio link and on the radio load.

According to the embodiment described here the first transmission mode TM1 is the so called diversity or single codeword transmission mode and the second transmission mode TM2 is the so called spatial multiplexing or double codeword transmission mode. Further, appropriate control, signaling and feedback channels are provided. Exemplarily, a Packet Downlink Control Channel (PDCCH) and a Packet Uplink Control Channel (PUCCH) is depicted in FIG. 1.

FIG. 2 shows a diagram depicting for four different transmission modes the possible average data throughputs for a radio link extending between a base station and a user equipment depending on the radio link quality. The average data throughputs have been calculated by the inventors of the invention described in this application by means of a sophisticated but reliable network simulation. The average data throughputs for the following four transmission modes are shown: Open Loop Spatial Multiplexing (OL-SM), Closed Loop Spatial Multiplexing (CL-SM), Open Loop Diversity (OL-D) and Closed Loop Diversity (CL-D).

As can be seen from the FIG. 2, for a good radio link quality, which is given by a SINR of at least 18 dB or 19 dB, the spatial multiplexing transmission modes OL-SM and CL-SM provide for the highest data throughput. As has already been mentioned above, the transmission modes OL-SM and CL-SM require a comparatively large signaling message called DCI format 2 or DCI format 2x message, whereas x=A or B. Below these SINRs, the diversity and CL-D provide for a noticeable larger data throughput. This holds at least for the comparison between the OL transmission modes OL-SM and OL-D and for the comparison between the CL transmission modes CL-SM and CL-D, respectively.

In order to provide for a high data throughput for comparatively good radio link qualities, a second threshold TH2 is defined. A fast dynamic MIMO switching is initiated when the quality of the radio link crosses the second threshold TH2. In order to avoid a frequently change of the transmission mode in case of small fluctuation of the SINR, the fast dynamic MIMO switching is carried out with a hysteresis behavior. In the described example the transmission mode is changed from diversity to spatial multiplexing if the SINR exceeds 19-20 dB. Further, the transmission mode is changed from spatial multiplexing to diversity if the SINR falls below 15-16 dB. This holds both for closed loop (CL) and open loop (OL). This hysteresis behavior is indicated in FIG. 2 by two ellipses being centered with respect to the second threshold TH2.

In order to provide also for a good data throughput for comparatively poor radio link qualities, a first threshold TH1 is defined. If for a given radio load the SINR crosses this threshold TH1, a slow Radio Resource Control (RRC) transmission mode switch is initiated.

Specifically, when the SINR falls below this first threshold TH1, the comparatively large DCI format 2x signaling message is replaced by the comparatively small DCI format 1x signaling message. Thereby, the possibility to carry out a fast dynamic MIMO switch is withdrawn but a significant load is removed from the Packet Downlink Control Channel (PDCCH). Accordingly, when the SINR exceeds this first threshold TH1, the comparatively small DCI format 1x signaling message will be replaced by the comparatively large DCI format 2x signaling message. Thereby, one the one hand more load will be imposed on the PDCCH but on the other hand the possibility to perform a fast MIMO switch will be given.

As can be seen from FIG. 2, the SINR value for the first threshold TH1 depends whether OL or CL transmission modes are considered. Specifically, for OL a first margin M1 separates the first threshold TH1 from the second threshold TH2 and for CL a slightly larger margin M2 separates the first threshold TH1 from the second threshold TH2.

In other words, when applying the described fast dynamic MIMO switching at the second threshold TH2 on top of the slow transmission mode switching at the first threshold TH1, the SNIR axis can be segmented in three regions.

Within a first region extending up to the first threshold TH1, the diversity transmission modes OL-D or CL-D are selected and a comparatively small DCI format 1x signaling message is used by the sender (i.e. the BS or the UE) in order to inform the receiver (i.e. the UE or the BS), which transmission mode will be used for the following data signals.

Within a second region extending between the first threshold TH1 and the second threshold TH2, the diversity transmission modes OL-D or CL-D are still used. However, a comparatively large DCI format 2x signaling message is used by the sender (i.e. the BS or the UE) in order to inform the receiver (i.e. the UE or the BS), which transmission mode will be used for the following data signals. Using the DCI format 2x signaling message provides the possibility to perform on a fast time scale of for instance 1 ms or slightly more to perform a fast dynamic MIMO switching at the second threshold TH2, if the SINR exceeds the second threshold TH2.

Within a third region above the second threshold TH2 the spatial multiplexing transmission modes OL-SM or CL-SM are used. These transmission modes, which require DCI format 2x signaling messages, allow for a significantly higher data throughput.

LIST OF REFERENCE SIGNS

BS base station
PDCCH Packet Downlink Control Channel
PUCCH Packet Uplink Control Channel
TM1 first transmission mode
TM2 second transmission mode
UE user equipment
110 control device
111 first determining unit
112 second determining unit
113 selecting unit
OL-SM Open Loop Spatial Multiplexing
CL-SM Closed Loop Spatial Multiplexing
OL-D Open Loop Diversity
CL-D Closed Loop Diversity
M1 first margin
M2 second margin
TH1 first threshold
TH2 second threshold

The invention claimed is:

1. A method for selecting a transmission mode for a radio data transfer between a user equipment and a base station of a telecommunication network, the method comprising:
    determining a quality of a radio link, which extends between the user equipment and the base station,
    determining a radio load within the telecommunication network, and
    in response to the quality of the radio link crossing a first threshold and the radio load is equal to a first load, changing transmission mode using a slow Radio Resource Control (RRC) signaling message, wherein changing the transmission mode using the slow RRC signaling takes longer than a dynamic MIMO (Multi-Input-Multi-Output) switching;
    in response to the quality of the radio link crossing a second threshold and the radio load is equal to a second load, changing transmission mode by performing the dynamic MIMO switching;
    wherein the first load is larger than the second load;
    wherein the quality of the radio link being assigned to the second threshold is different than the quality of the radio link being assigned to the first threshold; and
    wherein the difference between the first threshold and the second threshold for a closed loop transmission mode selection is different than the difference between the first threshold and the second threshold for an open loop transmission mode selection.

2. The method as set forth in claim 1, wherein the transmission mode is selected from one or more of:
    1TX-2RX,
    Single user MIMO: diversity, single codeword transmission, double codeword transmission and spatial multiplexing,
    Multi-User MIMO mode, and
    Cooperative MIMO mode.

3. The method as set forth in claim 1, further comprising determining an actual speed of the user equipment, wherein selecting the transmission mode further takes into account the actual speed.

4. The method as set forth in claim 1, further comprising determining at least one further technical capability of the user equipment, wherein selecting the transmission mode further takes into account the determined further technical capability.

5. The method as set forth in claim 1, further comprising determining at least one further quality of service requested by the user equipment, wherein selecting the transmission mode further takes into account the requested at least one further quality of service.

6. The method as set forth in claim 1, wherein selecting the transmission mode is started only at predefined starting times.

7. The method as set forth in claim 1, wherein selecting the transmission mode
is bound to a certain time interval and
is confirmed by a radio resource control message, which is transmitted from the user equipment to the base station.

8. The method as set forth in claim 1, wherein a first selected transmission mode is a default transmission mode.

9. The method as set forth in claim 1, wherein the quality of the radio link associated with the second threshold is better than the quality of the radio link associated with the first threshold.

10. A control device for selecting a transmission mode for a radio data transfer between a user equipment and a base station of a telecommunication network, the control device comprising one or more processors and one or more memories including computer program code, the one or more memories and the computer program code configured, with the one or more processors, to cause the apparatus to perform at least the following:
determining a quality of a radio link, which extends between the user equipment and the base station,
determining a radio load within the telecommunication network, and
in response to the quality of the radio link crossing a first threshold and the radio load is equal to a first load, changing transmission mode using a slow Radio Resource Control (RRC) signaling message, wherein changing the transmission mode using the slow RRC signaling takes longer than a dynamic MIMO (Multi-Input-Multi-Output) switching;
in response to the quality of the radio link crossing a second threshold and the radio load is equal to a second load, changing transmission mode by performing the dynamic MIMO switching;
wherein the first load is larger than the second load;
wherein the quality of the radio link being assigned to the second threshold is different than the quality of the radio link being assigned to the first threshold; and
wherein the difference between the first threshold and the second threshold for a closed loop transmission mode selection is different than the difference between the first threshold and the second threshold for an open loop transmission mode selection.

11. An apparatus comprising one or more processors and one or more memories including computer program code, the one or more memories and the computer program code configured, with the one or more processors, to cause the apparatus to perform at least the following:
determining a quality of a radio link which extends between a user equipment and a base station,
determining a radio load within a telecommunication network, and
in response to the quality of the radio link crossing a first threshold and the radio load is equal to a first load, changing transmission mode using a slow Radio Resource Control (RRC) signaling message, wherein changing the transmission mode using the slow RRC signaling takes longer than a dynamic MIMO (Multi-Input-Multi-Output) switching;
in response to the quality of the radio link crossing a second threshold and the radio load is equal to a second load, changing transmission mode by performing the dynamic MIMO switching;
wherein the first load is larger than the second load;
wherein the quality of the radio link being assigned to the second threshold is different than the quality of the radio link being assigned to the first threshold; and
wherein the difference between the first threshold and the second threshold for a closed loop transmission mode selection is different than the difference between the first threshold and the second threshold for an open loop transmission mode selection.

12. The apparatus of claim 11, wherein the one or more memories and the computer program code are further configured for selecting the transmission mode from any of the transmission modes:
1TX-2RX,
Single user MIMO: diversity, single codeword transmission, double codeword transmission and spatial multiplexing,
Multi-User MIMO mode, and
Cooperative MIMO mode.

13. The apparatus of claim 11, wherein the one or more memories and the computer program code are further configured for determining an actual speed of the user equipment, wherein selecting the transmission mode further takes into account the actual speed.

14. The apparatus of claim 11, wherein the one or more memories and the computer program code are further configured for determining at least one further technical capability of the user equipment, wherein selecting the transmission mode further takes into account the determined further technical capability.

15. The apparatus of claim 11, wherein the one or more memories and the computer program code are further configured for determining at least one further quality of service requested by the user equipment, wherein selecting the transmission mode further takes into account the requested at least one further quality of service.

* * * * *